(12) United States Patent
Lin (10) Patent No.: US 8,279,413 B2
(45) Date of Patent: Oct. 2, 2012

(54) OPTICAL SIGHT HAVING A RANGE-FINDING FUNCTION

(75) Inventor: Chi-Hsing Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 397 days.

(21) Appl. No.: 12/694,357

(22) Filed: Jan. 27, 2010

(65) Prior Publication Data

US 2011/0181862 A1 Jul. 28, 2011

(51) Int. Cl.
*G01C 3/08* (2006.01)

(52) U.S. Cl. ...... 356/4.01; 356/3.01; 356/4.1; 356/5.01; 43/119

(58) Field of Classification Search ........ 356/3.01–3.15, 356/4.01–4.1, 5.01–5.15, 6–22, 28, 28.5; 43/119

See application file for complete search history.

(56) References Cited

U.S. PATENT DOCUMENTS

| 7,230,684 B2 * | 6/2007 | Staley et al. | 356/4.01 |
| 2009/0320348 A1 * | 12/2009 | Kelly | 42/119 |

* cited by examiner

*Primary Examiner* — Luke Ratcliffe
(74) *Attorney, Agent, or Firm* — Trop, Pruner & Hu, P.C.

(57) ABSTRACT

An optical sight includes an outer barrel unit, an objective lens unit, an ocular lens unit, a magnification unit, a mounting unit, and a range-finding module. The outer barrel unit extends about an axis and has a front end and a rear end. The objective lens unit is mounted to the front end of the outer barrel unit. The ocular lens unit is mounted to the rear end of the outer barrel unit. The magnification unit is disposed between the objective lens unit and the ocular lens unit. The mounting unit is disposed in the outer barrel unit between the objective lens unit and the magnification unit, and has an outer peripheral surface, and an inner passage extending along the axis. The range-finding module is disposed in the outer barrel unit, and includes a light emitter, a light receiver, and a circuit board unit.

13 Claims, 9 Drawing Sheets

OPTICAL SIGHT HAVING A RANGE-FINDING FUNCTION

BACKGROUND OF THE INVENTION

1. Field of the Invention

The present invention relates to an optical sight, more particularly to an optical sight having a range-finding function.

2. Description of the Related Art

Figure 1:
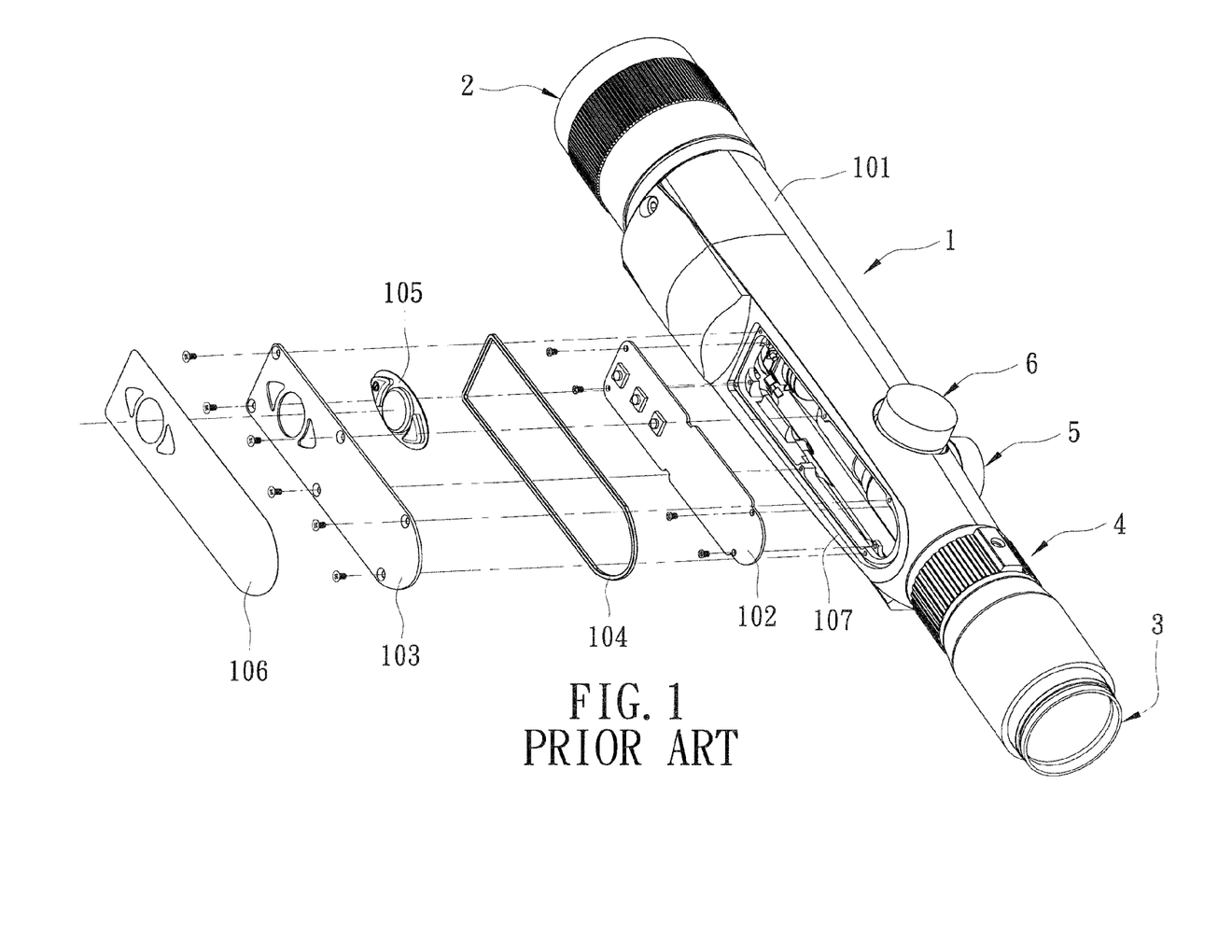
FIG. 1 is a partly exploded perspective view of a conventional optical sight having a range-finding function.
Figure 2:
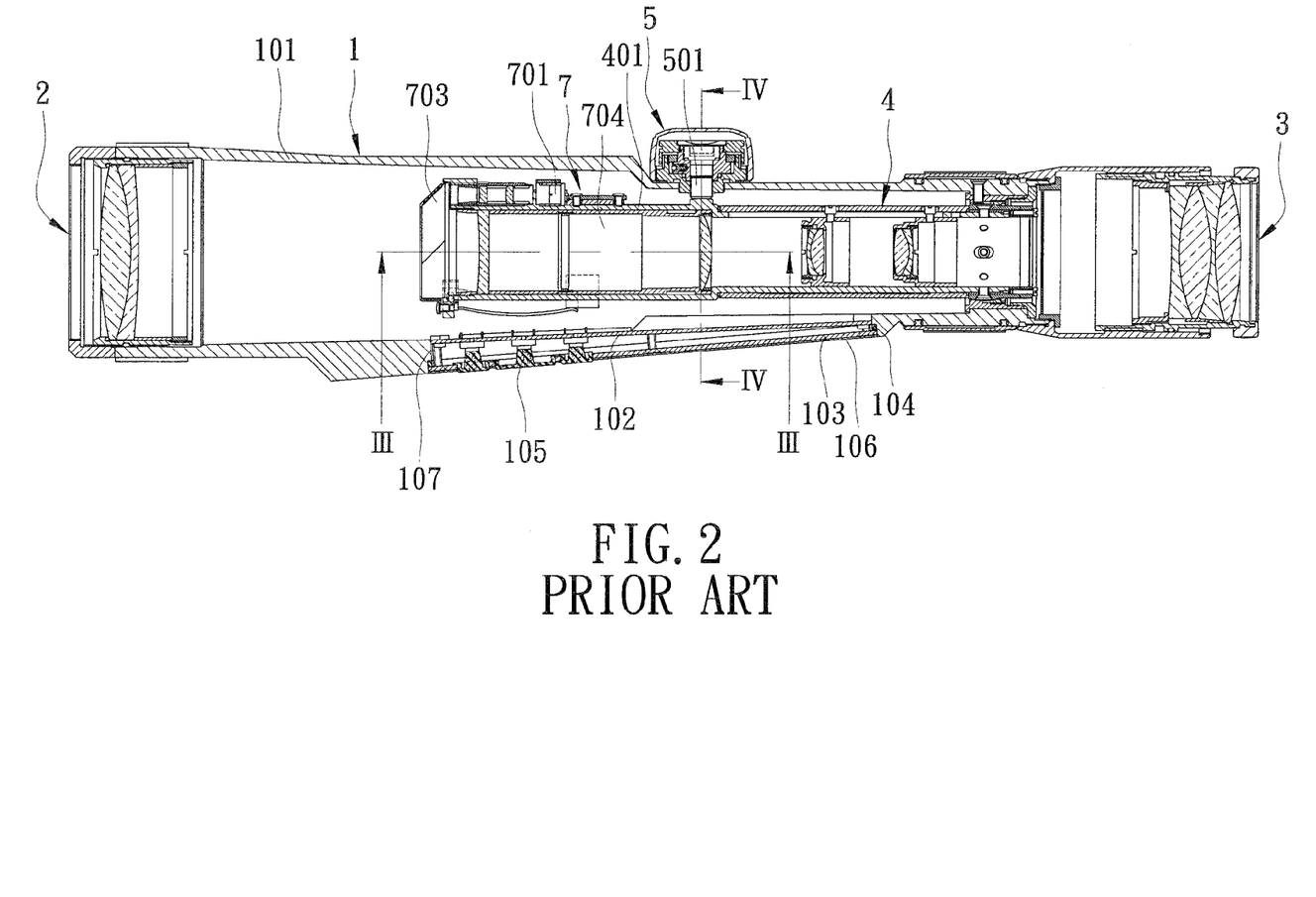
FIG. 2 is a sectional view of the conventional optical sight.
Figure 3:
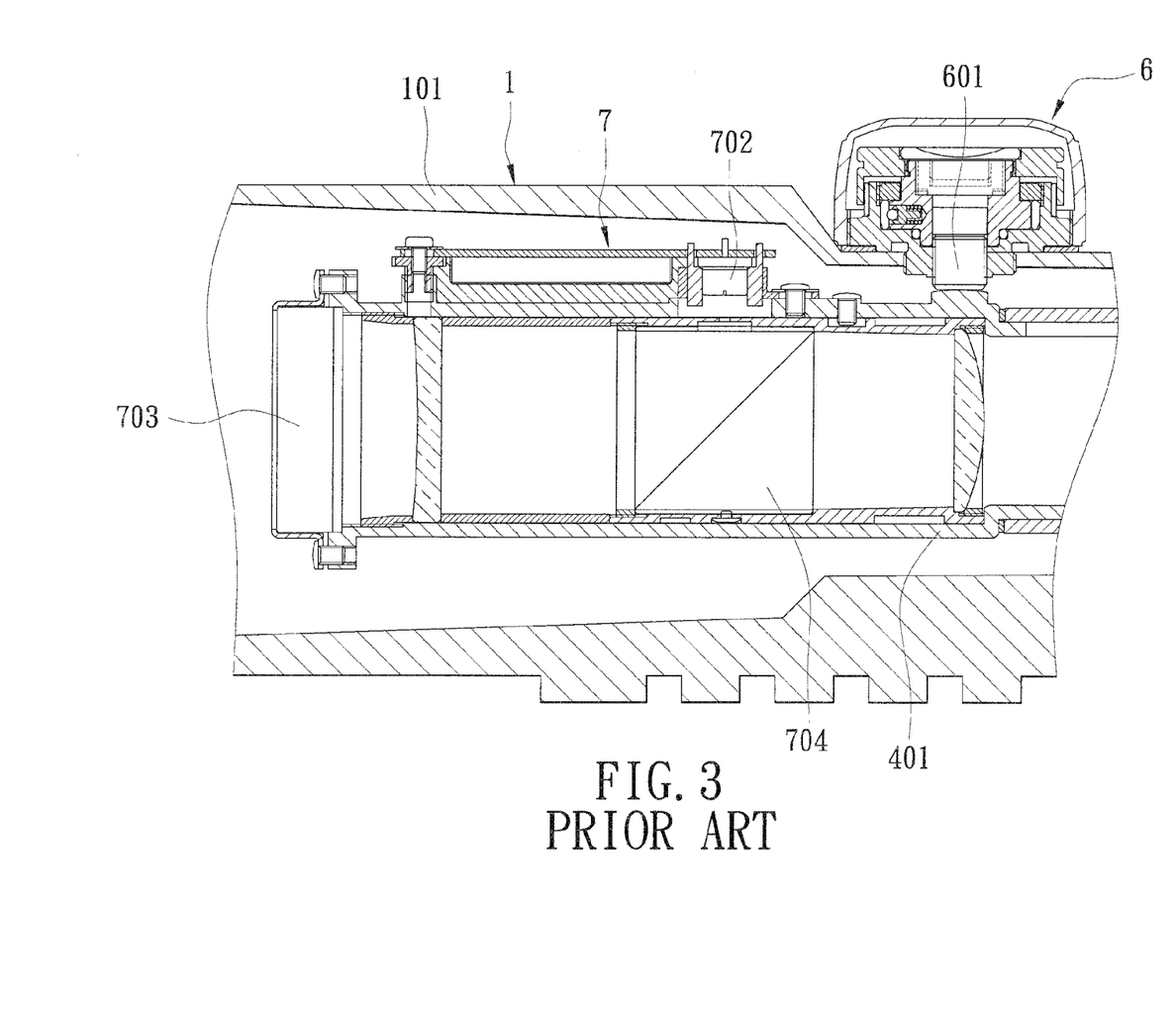
FIG. 3 is a fragmentary sectional view of the conventional optical sight taken along line in FIG. 2.

As shown in FIGS. 1, 2, and 3, a conventional optical laser sight having a range-finding function includes an outer barrel unit 1, an objective lens unit 2, an ocular lens unit 3, a magnification unit 4 disposed in the outer barrel unit 1 and which can adjust a magnification of the optical laser sight, two adjusting devices 5, 6 respectively disposed on a right side and atop side of the outer barrel unit 1, and a range-finding module 7 associated with the magnification unit 4. The outer barrel unit 1 includes a barrel body 101 with a rectangular opening 107, a main circuit board 102 mounted in the rectangular opening 107 and located on a left side of the magnification unit 4, a cover body 103 mounted on a left side of the barrel body 101, a waterproof ring 104 positioned between the cover body 103 and the barrel body 101, an operating button 105 mounted on the cover body 103, and an outer cover 106 mounted on the barrel body 101 and covering the cover body 103.

The magnification unit 4 includes an inner barrel component 401.

The adjusting devices 5, 6 respectively include adjustment screws 501, 601, which abut against a right side and a top side of the inner barrel component 401, respectively.

The range-finding module 7 includes a light emitter 701 disposed on the right side of the inner barrel component 401 and electrically connected to the main circuit board 102, a light receiver 702 disposed on the top side of the inner barrel component 401 and electrically connected to the main circuit board 102, a first prism 703 disposed on a front end of the inner barrel component 401, and a second prism 704 disposed in the inner barrel component 401.

The light emitter 701 emits light that is directed to a target through reflection by the first prism 703. The light then reflected by the target passes again through the first prism 703, and is reflected by the second prism 704 to reach the light receiver 702. Accordingly, the main circuit board 102 can calculate a distance to the target.

Figure 4:
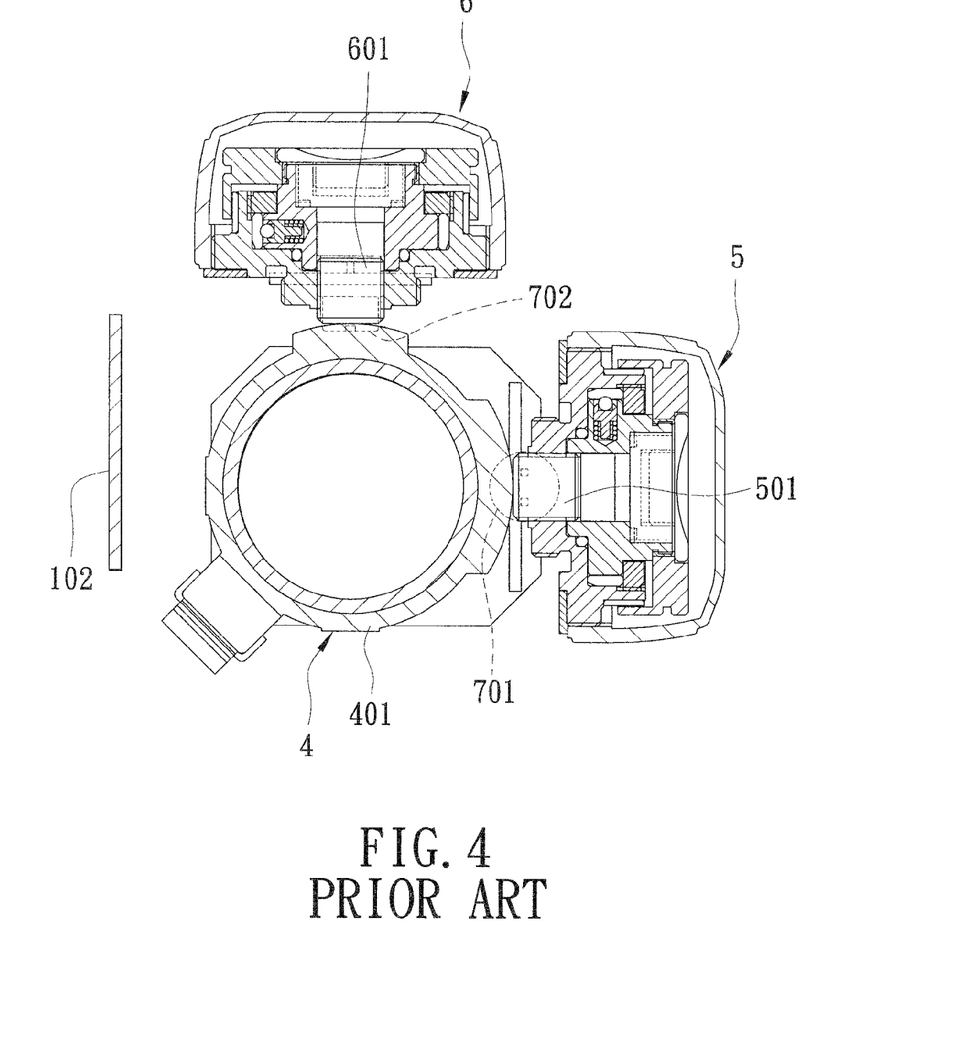
FIG. 4 is a sectional view of the conventional optical sight taken along line IV-IV in FIG. 2.

However, this conventional optical sight has disadvantages as follows:

i) As shown in FIG. 1, the main circuit board 102 needs to be mounted on the left side of the magnification unit 4 due to the arrangement of internal circuitry and wiring, and hence, the large rectangular opening 107 must be formed in the barrel body 101 to allow such mounting of the main circuit board 102. However, this makes it necessary for the optical sight to include a waterproofing mechanism for the main circuit board 102, thereby resulting in a complicated structure and increased manufacturing costs. In addition, the main circuit board 102 is located on the left side of the barrel body 101, which places significant limitations on design due to the waterproofing required for the main circuit board 102.

ii) As shown in FIGS. 2 to 4, it is necessary to dispose the light emitter 701 and the light receiver 702 respectively to the right side and the top side of the inner barrel component 401 due to the positioning of the main circuit board 102. Furthermore, the adjusting devices 5, 6 are also disposed respectively on the right side and the topside of the barrel body 101 of the outer barrel unit 1. As a result, the light emitter 701 and the light receiver 702 must be arranged out of the way of the adjusting devices 5, 6 (e.g., respectively to the front of the adjusting devices 5, 6). Ultimately, limitations are placed with respect to the degree to which the mounting positions of the adjusting devices 5, 6 may be varied.

SUMMARY OF THE INVENTION

Therefore, the object of the present invention is to provide an optical sight having a range-finding function, and which has a simplified structure, an attractive design, and more available space to thereby allow for greater variability in internal structure.

Accordingly, an optical sight of the present invention comprises an outer barrel unit, an objective lens unit, an ocular lens unit, a magnification unit, amounting unit, and a range-finding module. The outer barrel unit extends about an axis and has a front end and a rear end. The objective lens unit is mounted to the front end of the outer barrel unit. The ocular lens unit is mounted to the rear end of the outer barrel unit. The magnification unit is disposed between the objective lens unit and the ocular lens unit. The mounting unit is disposed in the outer barrel unit between the objective lens unit and the magnification unit. The mounting unit has an outer peripheral surface, and an inner passage extending along the axis. The range-finding module is disposed in the outer barrel unit and includes a light emitter disposed on the magnification unit, a light receiver disposed on the magnification unit, and a circuit board unit. The circuit board unit includes a main circuit board mounted on the outer peripheral surface of the mounting unit. The main circuit board is electrically connected to the light emitter and the light receiver and is operable to calculate a distance to a target in cooperation with the light emitter and the light receiver.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 5:
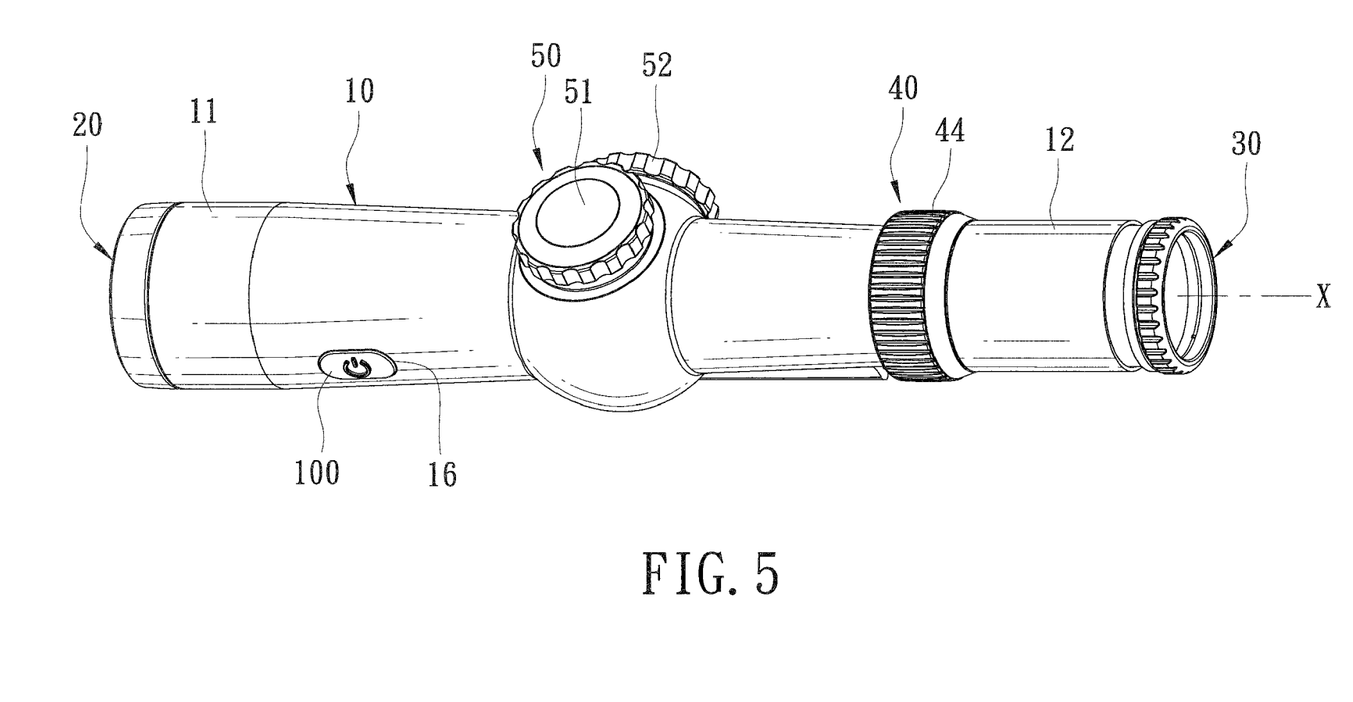
FIG. 5 is a perspective view of an optical sight having a range-finding function according to a preferred embodiment of the present invention.
Figure 6:
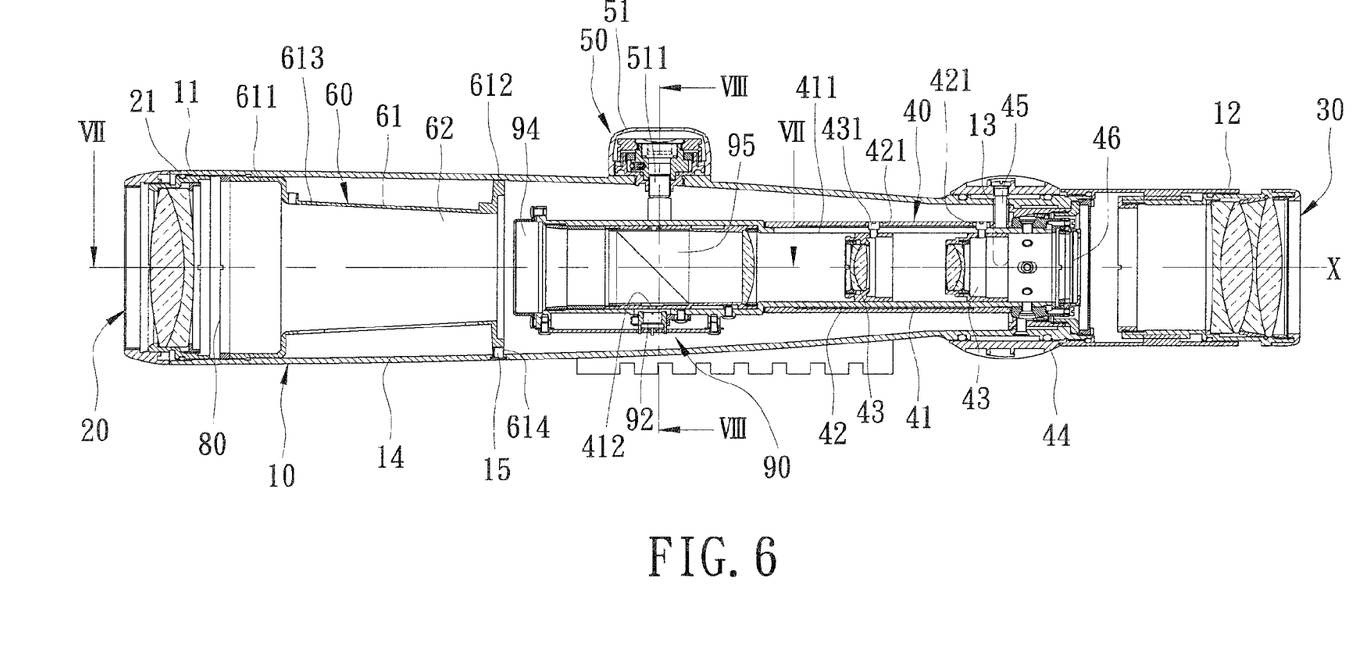
FIG. 6 is a sectional view of the optical sight of the preferred embodiment.
Figure 7:
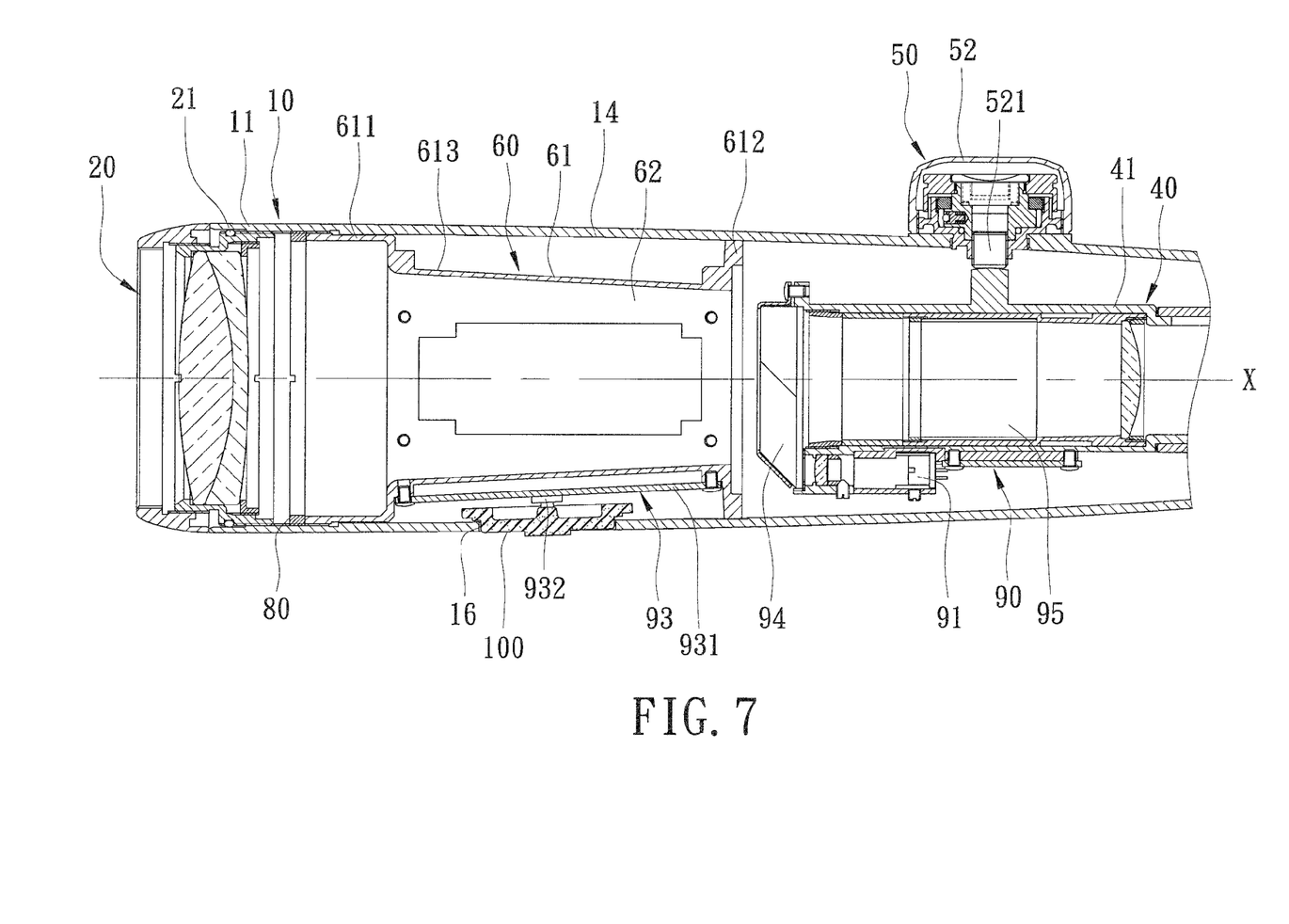
FIG. 7 is a fragmentary sectional view of the optical sight of the preferred embodiment taken along line VII-VII in FIG. 6.

Referring to FIGS. 5, 6, and 7, a preferred embodiment of an optical sight according to the present invention is shown to comprise an outer barrel unit 10, an objective lens unit 20, an ocular lens unit 30, a magnification unit 40, an adjustment unit 50, amounting unit 60, a biasing member 70, a press ring 80, a range-finding module 90, and an operating button 100.

As shown in FIGS. 5 to 7, the outer barrel unit 10 extends about an axis (X) and has a front end 11, a rear end 12, a circumferentially extending slot 13 that at least partially surrounds the axis (X), an inner peripheral surface 14, a positioning component 15 that is disposed on the inner peripheral surface 14 and extends out of the inner peripheral surface 14 to securely set a mounting angle of the mounting unit 60, and an aperture 16 in which the operating button 100 is mounted and which is in proximity to the front end 11. In this embodiment, the positioning component 15 is a screw.

As shown in FIGS. 5 and 6, the objective lens unit 20 is mounted to the front end 11 of the outer barrel unit 10, and includes an O-ring 21. The O-ring 21 ensures that water does not leak into the outer barrel unit 10 between the objective lens unit 20 and the outer barrel unit 10.

As shown in FIGS. 5 and 6, the ocular lens unit 30 is mounted to the rear end 12 of the outer barrel unit 10.

As shown in FIGS. 5 and 6, the outer barrel unit 10 is provided with the magnification unit 40. The magnification unit 40 is disposed between the objective lens unit 20 and the ocular lens unit 30, and includes a first inner barrel component 41 rotatably disposed in the outer barrel unit 10, a second inner barrel component 42 sleeved on the first inner barrel component 41, a plurality of lens assemblies 43 disposed in the first inner barrel component 41 and movable in a direction along the axis (X), a magnification adjusting ring 44 sleeved on the outer barrel unit 10, an adjusting pin 45 disposed on the magnification adjusting ring 44, and an aiming reticle 46 disposed on a rear end of the first inner barrel component 41.

The first inner barrel component 41 has a guide slot 411 and an orifice 412. The second inner barrel component 42 has a plurality of cam slots 421 that respectively correspond to the lens assemblies 43. Each of the lens assemblies 43 has a guide pin 431 that extends through the guide slot 411 and into a respective one of the cam slots 421. The adjusting pin 45 extends through the circumferentially extending slot 13 to connect to the second inner barrel component 42. Manipulation of the magnification adjusting ring 44 results in movement of the second inner barrel component 42 to thereby result in displacement of at least one of the lens assemblies 43 such that a change in magnification occurs.

Figure 8:
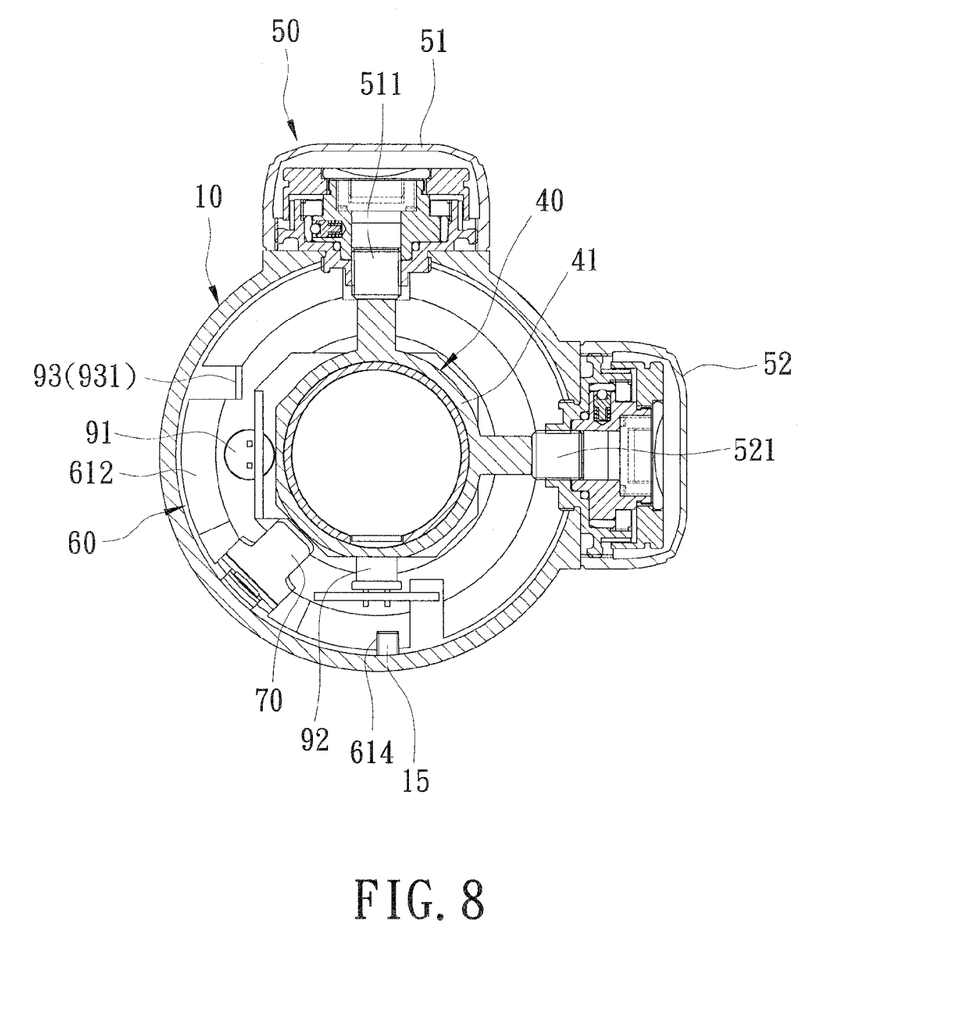
FIG. 8 is a sectional view of the optical sight of the preferred embodiment taken along line VIII-VIII in FIG. 6.

As shown in FIGS. 6 to 8, the adjustment unit 50 is disposed on the outer barrel unit 10, and includes two adjusting devices 51, 52 on a top side and a right side of the outer barrel unit 10, respectively. Each of the adjusting devices 51, 52 includes an adjusting component 511, 521 that extends into the outer barrel unit 10 and abuts against an outer peripheral surface of the first inner barrel component 41. The adjusting components 511, 521 can be manipulated respectively for elevation and windage adjustment of the aiming reticle 46.

In addition to the elevation and windage adjustment of the aiming reticle 46 described above, manipulation of each of the adjusting devices 51, 52 results in displacement of a corresponding one of the adjusting components 511, 512, such that the first inner barrel component 41 is re-positioned and the light emitter 91 and the light receiver 92 are displaced in a corresponding manner.

Figure 9:
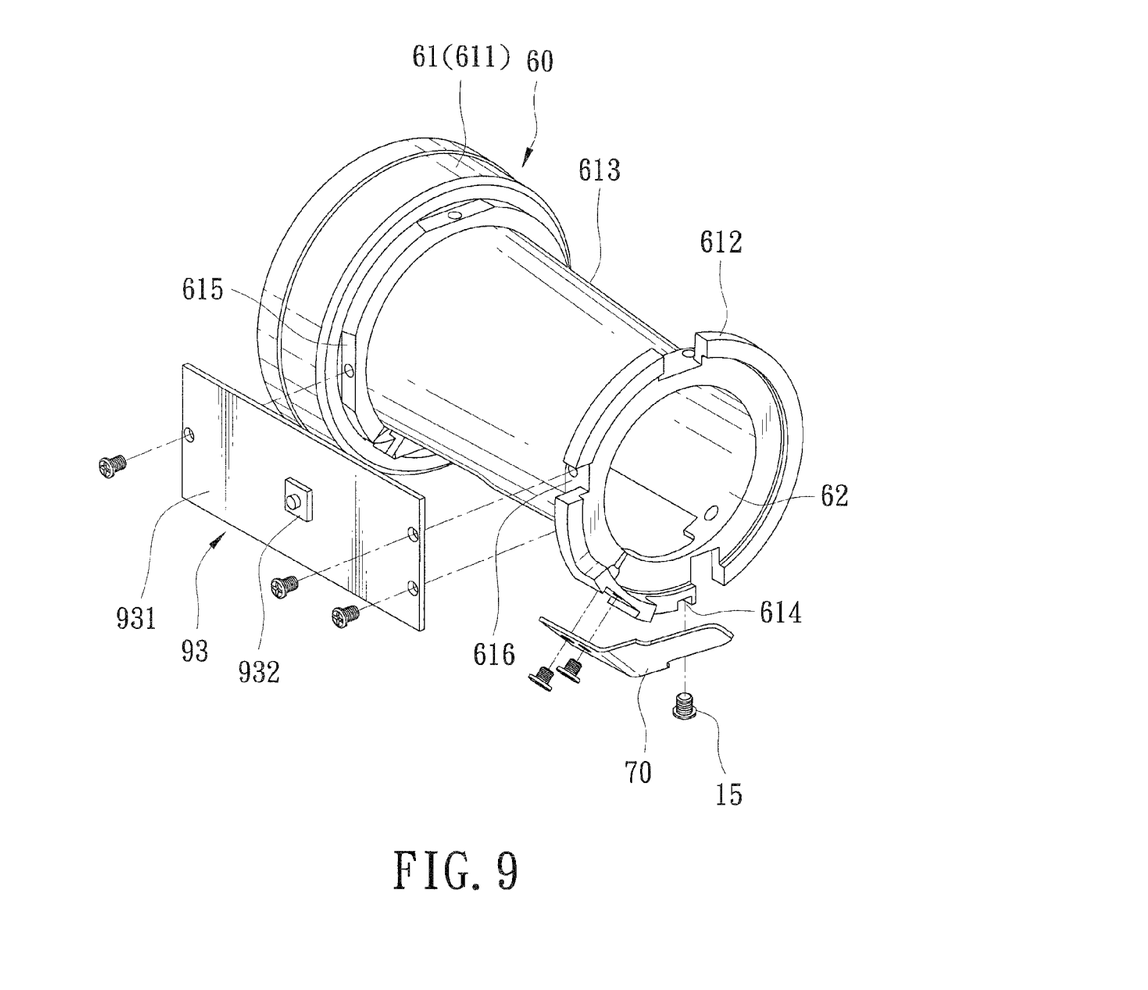
FIG. 9 is an exploded perspective view of amounting unit, a main circuit board, and a biasing member of the preferred embodiment.

As shown in FIGS. 6, 7, and 9, the mounting unit 60 is disposed in the outer barrel unit 10 between the objective lens unit 20 and the magnification unit 40, and has a surrounding wall 61 with an outer peripheral surface 613, and an inner passage 62 extending along the axis (X). The surrounding wall 61 extends about the axis (X) and defines the inner passage 62. The surrounding wall 61 has a front end portion 611 in proximity to the objective lens unit 20, a rear end portion 612 in proximity to the magnification unit 40, and a positioning groove 614 which is formed in the rear end portion 612 and in which the positioning component 15 is received. The outer peripheral surface 613 of the mounting unit 60 has a front mounting portion 615 adjacent to the front end portion 611 and a rear mounting portion 616 adjacent to the rear end portion 612, both of which are disposed about the axis (X).

As shown in FIGS. 8 and 9, the biasing member 70 is disposed in the outer barrel unit 10. One end of the biasing member 70 is mounted on the rear end portion 612 of the surrounding wall 61, and the other end of the biasing member 70 presses against the first inner barrel component 41 of the magnification unit 40 such that the first inner barrel component 41 is maintained in contact with the adjusting components 511, 521.

As shown in FIGS. 6 and 7, the press ring 80 is disposed in the outer barrel unit 10, couples threadedly with the inner peripheral surface 14 of the outer barrel unit 10, and abuts against the front end portion 611 of the surrounding wall 61 of the mounting unit 60.

As shown in FIGS. 6 to 8, the range-finding module 90 is disposed in the outer barrel unit 10, and includes a light emitter 91 disposed on the magnification unit 40, a light receiver 92 disposed on the magnification unit 40, a circuit board unit 93, a first prism 94 disposed on a front end of the first inner barrel component 41, and a second prism 95 disposed in the first inner barrel component 41.

The light emitter 91 is disposed on a left side of the outer peripheral surface of the first inner barrel component 41 and is disposed opposite to the adjusting device 52. The light receiver 92 is disposed on a bottom side of the outer peripheral surface of the first inner barrel component 41 and is disposed opposite to the adjusting device 51. The orifice 412 of the first inner barrel component 41 is between the second prism 95 and the light receiver 92.

In this embodiment, the light emitter 91 includes a laser diode (LD), and the light receiver 92 includes an avalanche photodiode (APD).

The circuit board unit 93 includes a main circuit board 931 mounted on the outer peripheral surface 613 of the mounting unit 60. In the preferred embodiment, the main circuit board 931 abuts against the front and rear mounting portions 615, 616, as shown in FIG. 9. The main circuit board 931 is electrically connected to the light emitter 91 and the light receiver 92 and is operable to calculate a distance to a target in cooperation with the light emitter 91 and the light receiver 92. The main circuit board 931 further includes a switch 932 opposite to the operating button 100.

As shown in FIGS. 5 and 7, the operating button 100 is mounted in the aperture 16, and may be manipulated to activate the switch 932 of the main circuit board 931.

As shown in FIGS. 6 and 7, when the operating button 100 is pressed, the light emitter 91 emits light that is directed to the target through reflection by the first prism 94, and the light then reflected by the target passes again through the first prism 94 and is reflected by the second prism 95 to reach the light receiver 92 via the orifice 412. The main circuit board 931 is provided with a micro processing unit (now shown), which can use a time difference between emitting and receiving the light to calculate the distance to the target.

The advantages of the present invention can be summarized as follows:

i) The main circuit board 931 is mounted on the mounting unit 60, and is between the objective lens unit 20 and the magnification unit 40. The main circuit board 931 and the objective lens unit 20 may share the same waterproofing mechanism so the present invention does not need an additional dedicated waterproofing mechanism for the main circuit board 931. Compared to the prior art, the whole structure of the present invention is simplified, which reduces manufacturing costs.

ii) The main circuit board 931 is disposed in the outer barrel unit 10 and does not affect the appearance of the outer barrel unit 10. Compared to the prior art, the present invention may be designed in a variety of ways and is not limited in this respect due to the mounting of the main circuit board 931.

iii) The main circuit board 931 is located between the objective lens unit 20 and the magnification unit 40. The mounting of the main circuit board 931 does not affect the arrangement of the magnification unit 40 such that there is more available space around the magnification unit 40. Therefore, the light emitter 91 and the light receiver 92 are disposed on the left side and bottom side of the first inner barrel component 41, respectively, and are disposed opposite to the adjusting devices 52, 51, respectively. Compared to the prior art, the light emitter 91 and the light receiver 92 do not place limitations on the arrangement of the adjusting devices 52, 51.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical sight having a range-finding function comprising:
    an outer barrel unit extending about an axis and having a front end and a rear end;
    an objective lens unit mounted to said front end of said outer barrel unit;
    an ocular lens unit mounted to said rear end of said outer barrel unit;
    a magnification unit disposed between said objective lens unit and said ocular lens unit;
    a mounting unit disposed in said outer barrel unit between said objective lens unit and said magnification unit, said mounting unit having an outer peripheral surface, and an inner passage extending along the axis; and
    a range-finding module disposed in said outer barrel unit and including a light emitter disposed on said magnification unit, a light receiver disposed on said magnification unit, and a circuit board unit, said circuit board unit including a main circuit board mounted on said outer peripheral surface of said mounting unit, said main circuit board being electrically connected to said light emitter and said light receiver and operable to calculate a distance to a target in cooperation with said light emitter and said light receiver.

2. The optical sight as claimed in claim 1, wherein said mounting unit has a surrounding wall extending about the axis and defining the inner passage, said surrounding wall having a front end portion in proximity to said objective lens unit, and a rear end portion in proximity to said magnification unit.

3. The optical sight as claimed in claim 2, wherein said surrounding wall has a positioning groove formed in said rear end portion, said outer barrel unit having an inner peripheral surface, and a positioning component disposed on said inner peripheral surface and extending out of said inner peripheral surface and into said positioning groove.

4. The optical sight as claimed in claim 2, wherein said outer peripheral surface of said mounting unit has a front mounting portion adjacent to said front end portion and a rear mounting portion adjacent to said rear end portion, said main circuit board abutting against said front and rear mounting portions.

5. The optical sight as claimed in claim 2, further comprising a press ring disposed in said outer barrel unit, said press ring abutting against said front end portion of said surrounding wall of said mounting unit.

6. The optical sight as claimed in claim 2, further comprising a biasing member disposed in said outer barrel unit, one end of said biasing member being mounted on said rear end portion of said surrounding wall, and the other end of said biasing member pressing against said magnification unit.

7. The optical sight as claimed in claim 6, wherein said magnification unit has a first inner barrel component rotatably disposed in said outer barrel unit.

8. The optical sight as claimed in claim 7, further comprising an adjustment unit disposed on said outer barrel unit, said adjustment unit including two adjusting devices, each of the adjusting devices including an adjusting component that extends into said outer barrel unit and abuts against an outer peripheral surface of said first inner barrel component, said light emitter being disposed on said outer peripheral surface of said first inner barrel component and being disposed opposite to one of said adjusting devices, said light receiver being disposed on said outer peripheral surface of said first inner barrel component and being disposed opposite to the other one of said adjusting devices.

9. The optical sight as claimed in claim 8, wherein:
    said range-finding module further includes a first prism disposed on a front end of said first inner barrel component, and a second prism disposed in said first inner barrel component, said first inner barrel component having an orifice between said second prism and said light receiver; and
    said light emitter emits light that is directed to the target through reflection by said first prism, the light then reflected by the target passing again through said first prism and being reflected by said second prism to reach said light receiver via said orifice.

10. The optical sight as claimed in claim 9, wherein said light emitter includes a laser diode, and said light receiver includes an avalanche photodiode.

11. The optical sight as claimed in claim 1, wherein said outer barrel unit has a circumferentially extending slot that at least partially surrounds the axis, said magnification unit including a second inner barrel component sleeved on said first inner barrel component, a plurality of lens assemblies disposed in said first inner barrel component and movable in a direction along the axis, a magnification adjusting ring sleeved on said outer barrel unit, and an adjusting pin disposed on said magnification adjusting ring, said adjusting pin extending through said circumferentially extending slot to connect to said second inner barrel component.

12. The optical sight as claimed in claim 11, wherein said first inner barrel component has a guide slot, said second inner barrel component having a plurality of cam slots that respectively correspond to said lens assemblies, each of said lens assemblies having a guide pin that extends through said guide slot and into a respective one of said cam slots.

13. The optical sight as claimed in claim 1, further comprising an operating button, said outer barrel unit having an aperture in which said operating button is mounted and which is in proximity to said front end, said main circuit board including a switch opposite to said operating button.

* * * * *